United States Patent [19]

Smith

[11] Patent Number: 4,631,923

[45] Date of Patent: Dec. 30, 1986

[54] SOLENOID OPERATED CHECK VALVE

[75] Inventor: Douglas W. P. Smith, Port Coquitlam, Canada

[73] Assignee: Devron Engineering Limited, North Vancouver, Canada

[21] Appl. No.: 806,129

[22] Filed: Dec. 9, 1985

Related U.S. Application Data

[63] Continuation of Ser. No. 544,237, Oct. 21, 1983, abandoned.

[51] Int. Cl.⁴ .......................... F16K 15/18; F03G 7/06
[52] U.S. Cl. ...................................... 60/530; 137/522; 137/529; 137/537
[58] Field of Search .................. 60/530; 137/522, 529, 137/537; 251/83

[56] References Cited

U.S. PATENT DOCUMENTS

| | | | | |
|---|---|---|---|---|
| 1,679,898 | 8/1928 | Gilbert | ............................ | 251/83 X |
| 3,421,546 | 1/1969 | Jennings | ............................ | 137/529 X |
| 3,744,751 | 7/1973 | Robinson | ............................ | 137/540 |
| 3,791,408 | 2/1974 | Saitou | ............................ | 137/529 |
| 4,070,859 | 1/1978 | Sobecks | ............................ | 60/530 |

Primary Examiner—Robert G. Nilson
Attorney, Agent, or Firm—Spensley Horn Jubas & Lubitz

[57] ABSTRACT

A check valve to be interposed between a source of pressure and a device to be moved by the application of the pressure. The valve has a passageway communicating with the source of pressure and a passageway communicating with the device. There is a valve seat formed between the two passageways and a valve member contacts the valve seat. A valve stem can move the valve member to rest on the valve seat to close the valve but the stem is separate from the valve. With lessening of pressure in the source of pressure beyond a desired level the check valve may be closed. Movement of the valve stem to a position away from the valve member ensures that the valve will open but only when the pressure on each side of the valve is about the same. A particular application is to protect the lip of a head box in a paper making machine but may applications are possible.

6 Claims, 5 Drawing Figures

SOLENOID OPERATED CHECK VALVE

This application is a continuation of application Ser. No. 544,237, filed Oct. 21, 1983, now abandoned.

FIELD OF THE INVENTION

This invention relates to a valve and, in particular, to a valve that finds use in any circumstances where a valve is required that does not respond to an instruction to change its position until the pressure on each side of the valve is about equal. The invention finds particular use in an actuating system comprising a substantially incompressible fluid, a flexible vessel and a reservoir having associated with it a heat source to heat the fluid to expand the flexible vessel. The description in this specification emphasizes this application.

DESCRIPTION OF THE PRIOR ART

Devron Engineering Limited produce a control mechanism that is of particular application for controlling the movement of the lip of a head box slice in a paper making machine. Devron's control mechanism comprises a first vessel with a substantially incompressible liquid within the vessel. There are means associated with the first vessel to vary the temperature of the incompressible liquid. There is an expandable member communicating with the first vessel and also full of the substantially incompressible liquid. Increase in the temperature of the incompressible liquid in the first vessel expands liquid from the first vessel toward the expandable member to expand that member.

This control mechanism provides an extremely sensitive control in any circumstances where sensitive adjustment, less than thousandths of an inch, is required. However it finds particular application and has proved to be of considerable success for the control of the lip of a head box slice in a paper making machine.

In making paper the fibre suspension that forms the paper sheet is applied to the wire of the paper making machine through a head box. Delivery from the head box to the wire section takes place at a slice nozzle consisting of two lips. Normally one lip is fixed and the second, usually the upper lip, is attached to a movable front wall of the head box so that it may be moved substantially perpendicularly to the flow direction, that is to widen or narrow the gap formed by the lips. This perpendicular movement is necessary to control the outward jet velocity by controlling the open area of the nozzle. Movement in the direction of the flow may also be practised to control the angle of impact of the jet onto the wire section.

It is usual to provide the movable lip with means to control the thickness of the jet across the width of the slice. This is normally done by mechanically deforming the lip at points at approximately four to twelve inch intervals across the width of the slice. Typically the deformation is achieved by several rods attached to the flexible lip and also connected to a fixed object. The effective length of the rod, and thus the deflection of the corresponding part of the slice lip, is changed by means of a screw jack attached to the rod. By varying the lengths of the rods across the width of the slice nozzle the lip contour and thus the slice opening profile, that is the configuration of the slice opening in the cross machine direction, can be varied.

There are disadvantages in the use of this system and these disadvantages are largely avoided by the control mechanism of above patent application. The control mechanism described in the above patent application can use check valves. The supply pipe through which the incompressible liquid is fed into the first vessel has a check valve so that the incompressible liquid will not expand out through the filling pipe when the liquid is heated. However the more important check valve is in the pipe connecting the first vessel to the expandable member. Although for normal operations this valve may be dispensed with, its use can become extremely important if there is a power failure so that the incompressible liquid in the first vessel is no longer heated. The liquid cools and then contracts backwardly into the vessel, contracting the expandable member. The effect of this can be to cause excessive distortion of the lip and, in particular, distortion past the elastic limit of the lip so that the lip is rendered worthless. In addition to the expense of replacing the lip this means that the machine must be stopped, with consequent loss in production, until the lip can be replaced.

The above patent application shows a somewhat diagrammatic check valve but the present application is concerned with a particular check valve that is of particular application in the environment of the above control system but is of general application where an effective but simple check valve is required, especially in the circumstances outlined in the opening paragraph.

In the environment of the paper making machine the valve desirably has solenoid activation for remote and/or computer control; a zero leakage valve; a positive shut-off as soon as the solenoid is activated to the closed position and an insurance that the valve will not open upon activating the solenoid until the pressure across the valve is equal.

SUMMARY OF THE INVENTION

Accordingly the present invention provides a valve for use with an actuating system comprising a substantially incompressible fluid, a flexible vessel and a reservoir having associated with it a heat source to heat the fluid to expand the vessel, the valve comprising a first passageway communicating with the reservoir; a second passageway communicating with the flexible vessel; a valve seat formed between the two passageways; a valve member to contact the valve seat; a valve stem operable to move the valve member to rest on the valve seat to close the valve but separate from the valve.

In a preferred embodiment the valve stem is operable by a solenoid.

Preferably the valve includes a third passageway with an electromagnet surrounding the third passageway. There is a magnetic core in the third passageway, the valve stem being adapted to move with the magnetic core, and spring means acting in a direction opposed to the direction moved by the magnetic core when the electromagnet is energized.

BRIEF DESCRIPTION OF THE DRAWINGS

Aspects of the invention are illustrated, merely by way of example, in the accompanying drawings in which.

DESCRIPTION OF THE PREFERRED EMBODIMENT

Figure 1:
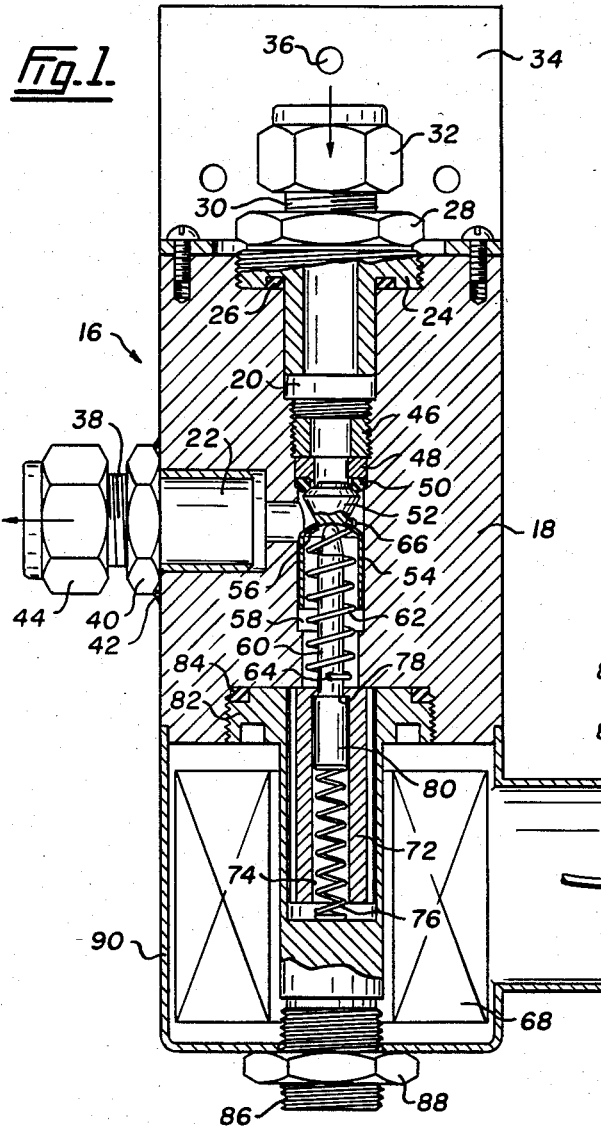
FIG. 1 is a section through a check valve according to the present invention.
Figure 5:
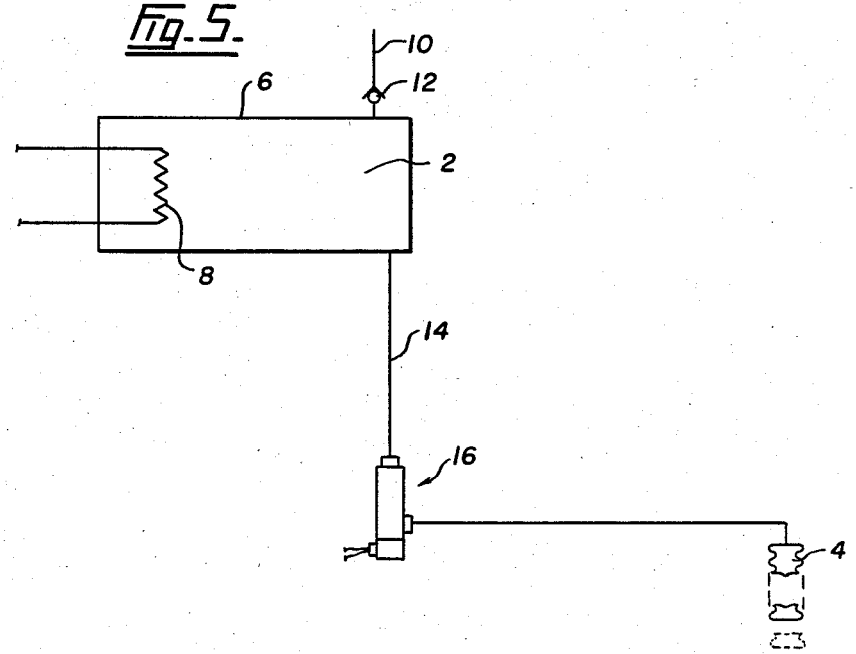
FIG. 5 is an overall view of a control system including a check valve according to the present invention.

FIG. 1 shows a valve for particular use in an environment shown in FIG. 5. That is with an actuating system comprising a substantially incompressible fluid 2 filling a flexible vessel 4, able to expand and contract, and a reservoir 6 having associated with it a heat source shown in FIG. 5 as a coil 8 of electrical wire to heat the fluid 2 to expand the flexible vessel 4. The reservoir has an inlet pipe 10 for incompressible fluid including a check valve 12. There is a pipe 14 joining the flexible vessel 4 and the resevoir 6 and that pipe 14 contains a check valve 16 according to the present invention.

As illustrated in FIG. 1 the check valve 16 comprises a body 18 formed with a first passageway 20 communicating with the reservoir 6. There is a second passageway 22 communicating with the flexible vessel 4. The first passageway 20 has conventional connection means in the form of an inlet member 24 threadably located within the body 18 and sealed with an 0 ring 26. There is a locking nut 28 mounted on a threaded stem 30. Nut 32 engages the end, (not shown), of pipe 14 in a manner conventional in hydraulics. There is a flange 34 formed with holes 36 to facilitate mounting of the valve 16.

The second passageway 22 has a threaded stem 38 located by nut 40 welded at 42. The pipe 14 to the flexible vessel 4 is attached using nut 44.

There is a valve seat formed between the passageways 20 and 22. The valve seat comprises threadedly located insert 46 engaged in the first passageway 20. A collar 48 has a flexible valve seat 50 located on it. There is a valve member to contact the valve seat 50. The valve member comprises a head 52 attached to a tubular housing 54 formed with an opening 56. The tubular housing 54 extends into a third passageway 58 and the opening 56 ensures that the pressure in the second and third passageways 22 and 58 is always equal.

A valve stem 60 is operable to move the valve member to rest on the valve seat 50 to close the valve and thus prevent fluid communication between the first and second passageways 21 and 22. It should be noted, and is an important feature of the present invention, that the valve member is separate from the valve stem 60 but is joined by a light tension spring 62 surrounding the stem 60 and located in the stem at 64 and in the valve member's tubular housing 54 at 66.

At the lower end of the valve in FIG. 1 there is a conventional solenoid comprising an electromagnet 68, shown diagrammatically, electrically connected to a power source (not shown) by leads 70. There is a magnetic core 72 having a central passageway 74 locating a light compression spring 76 whose action is against the action of the magnet 68, as is conventional in solenoid valves. The passageway 74 is formed with shoulders 78 at its upper edge to abut a thickened portion 80 of the valve stem 60. This arrangement ensures that the valve stem 60 always moves with the magnetic core 72 under the influence of energization of the magnet 68.

At its base the body 18 is closed with a threaded insert 82 having O ring 84. The threaded insert 82 extends downwardly to threaded stem 86. Lock nut 88 engages stem 86 to locate cover 90 for the solenoid.

In the valve position shown in FIG. 1 power is off to the solenoid and the magnetic core 72 is pushed from the electromagnet 68 by spring 76.

Figure 3:
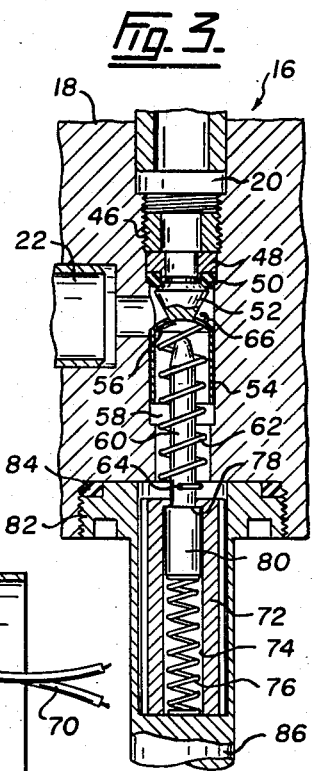
FIG. 3 is a detail of FIG. 1 showing a different position of a part of the valve.
Figure 2:
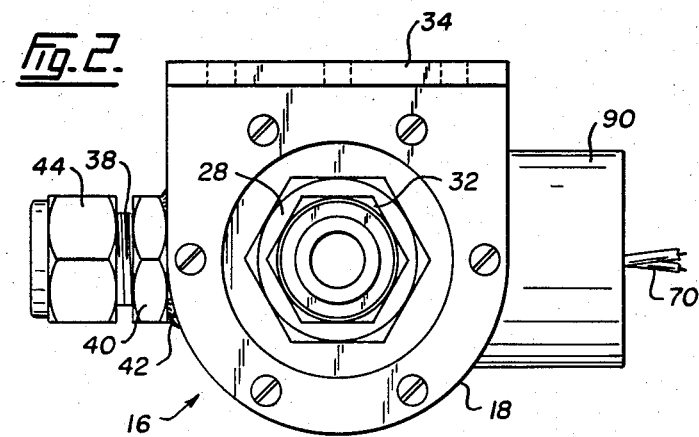
FIG. 2 is a plan view of the check valve in FIG. 1.

In FIG. 3 power is applied to the magnet 68, that is the magnet is said to be energized, but the pressure in the first and second passageways is such that pressure in the second passageway 22, the passageway leading to the flexible vessel 4, is greater than the pressure in the first passageway 20. As a result despite the fact that the solenoid valve is actuated and the valve stem 60 withdrawn the valve remains closed.

Figure 4:
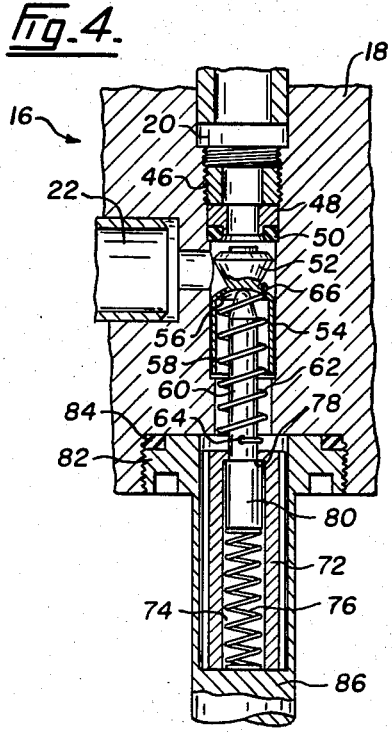
FIG. 4 is a further detail of the check valve of FIG. 1, again showing essential components in different positions.

FIG. 4 illustrates the next step. From the FIG. 3 position heat has been applied to the liquid 2, which expands from reservoir 6. The pressure across the valve member, that is in passageways 20 and 22, becomes equal and spring 62 thus moves head 52 off seat 50. Free flow then exists between passageways 20 and 22.

Thus with the valve open fluid can flow freely in two directions, allowing the actuator to move up and down freely in response to the temperature of the incompressible fluid in the reservoir. If power to the heater is interrupted the actuator will begin to recede in response to the cooling of the reservoir. The valve 16 can then be closed—the FIG. 1 position—locking fluid in the flexible vessel and thus locking the position of the actuator, while allowing the reservoir pressure to drop. When the pressure in the reservoir has dropped, the solenoid is activated open. The valve 16 is such that it will not open immediately. Immediate opening would allow the fluid to rush into the reservoir and a sharp change in the actuator position would result causing it to deform the lip. Activating the solenoid valve open leaves the valve 16 closed until the reservoir heater 8 brings the temperature of the reservoir fluid back to the temperature it was at when the valve 16 was closed. At this point pressure is equal across the valve 16 and valve 16 opens under the influence of spring 62. Once open the valve can act as an open two-way valve again, the FIG. 4 position.

The present invention provides an extremely simple and cheap method of preventing damage to expensive paper making machinery. Other solutions offered by other parties to prevent damages to a lip in the circumstances as outlined above require pressure transducers and electronic circuitry of considerable complexity. However the present valve operates with excellent efficiency although being relatively cheap to produce.

The check valve of the invention is of wider application than paper making. For example it may be used as a hydraulic press safety valve. With power off the valve is closed and when power is applied the valve would not open until the pressures on each side of the valve were equal. This prevents quick unexpected and therefor dangerous motion of the press.

I claim:

1. An actuating system comprising:
   a reservoir for storing substantially incompressible fluid;
   heating means for heating and pressurizing said fluid within the reservoir;
   a flexible actuator vessel adapted to expand and contract under the influence of pressure exerted by said fluid; and
   a valve for selectively, fluidically coupling the flexible actuator vessel to the reservoir, said valve including:
   a first passageway communicating with the reservoir;

a second passageway communicating with the flexible vessel;

a valve seat formed between the two passageways;

a valve member to contact the valve seat;

a valve stem separate from the valve member; and means for moving the valve stem between a first, extended position where it contacts the valve member to move the valve member onto the seat to close the valve when the heating means fails, to thereby maintain fluid pressure to the actuator vessel, and a second, retracted position wherein the valve member can move off the valve seat to open the valve once fluid pressure from the reservoir substantially equals the maintained fluid pressure to the vessel.

2. A valve as claimed in claim 1 wherein the moving means comprises:

a third passageway;

an electromagnet surrounding the third passageway;

a magnetic core in the third passageway;

the valve stem being adapted to move with the magnetic core; and compression spring means attached to the valve stem and acting in a direction opposed to the direction moved by the magnetic core when the electromagnet is energized, the compression spring means thus acting to tend to urge the valve stem into contact with the valve member.

3. A valve for use with an actuating system comprising a substantially incompressible fluid, a flexible vessel and a reservoir having associated with it a heat source to heat the fluid to expand the vessel, the valve comprising:

a first passageway communicating with the reservoir;

a second passageway communicating with the flexible vessel;

a valve seat formed between the two passageways;

a valve member to contact the valve seat;

a valve stem separate from the valve member;

a solenoid operable to move the valve stem between a first, extended position where it contacts the valve member to move the valve member onto the seat to close the valve and a second, retracted position where the valve member can move off the valve seat to open the valve;

a third passageway;

an electromagnet surrounding the third passageway;

a magnetic core in the third passageway;

the valve stem being adapted to move with the magnetic core;

compression spring means attached to the valve stem and acting in a direction opposed to the direction moved by the magnetic core when the electromagnet is energized, the compression spring means thus acting to tend to urge the valve stem into contact with the valve member;

a tubular housing which is slide fit in the third passageway, said valve member being attached to the tubular housing.

4. A valve for use with an actuating system comprising a substantially incompressible fluid, a flexible vessel and a reservoir having associated with it a heat source to heat the fluid to expand the vessel, the valve comprising:

a first passageway communicating with the reservoir;

a second passageway communicating with the flexible vessel;

a valve seat formed between the two passageways;

a valve member to contact the valve seat;

a valve stem separate from the valve member operable to move between a first, extended position where it contacts the valve member to move the valve member onto the seat to close the valve and a second, retracted position where the valve member can move off the valve seat to open the valve; and resilient means joining the valve stem and the valve member and tending to draw the valve member towards the valve stem but allowing independent movement of the valve stem and the valve member, said resilient means acting to move the valve member off the valve seat.

5. A valve as claimed in claim 4 in which the resilient means joining the valve stem to the valve member comprises a light tension spring.

6. The actuating system of claim 1 wherein the moving means includes a solenoid.

* * * * *